United States Patent
Williams

(10) Patent No.: US 10,648,797 B2
(45) Date of Patent: May 12, 2020

(54) MULTIPLE BEAM SCANNING SYSTEM FOR MEASURING MACHINE

(71) Applicant: Quality Vision International, Inc., Rochester, NY (US)

(72) Inventor: Daniel James Lawler Williams, Rochester, NY (US)

(73) Assignee: QUALITY VISION INTERNATIONAL INC., Rochester, NY (US)

( * ) Notice: Subject to any disclaimer, the term of this patent is extended or adjusted under 35 U.S.C. 154(b) by 0 days.

(21) Appl. No.: 15/814,525

(22) Filed: Nov. 16, 2017

(65) Prior Publication Data

US 2019/0145757 A1 May 16, 2019

(51) Int. Cl.
*G01B 11/14* (2006.01)
*G01B 9/02* (2006.01)
*G01B 11/24* (2006.01)

(52) U.S. Cl.
CPC ...... *G01B 11/2441* (2013.01); *G01B 9/02017* (2013.01); *G01B 9/02024* (2013.01); *G01B 9/02091* (2013.01)

(58) Field of Classification Search
CPC ..... G01B 11/24; G01B 11/25; G01B 11/2504; G01B 11/2518; G01B 11/2441; G01B 9/02017; G01B 9/02024; G01B 9/02091; G01N 21/33; G01N 21/95623; G05B 19/19; G05B 2219/25472; G05B 2219/41194; G05B 2219/41195; G06T 7/004

See application file for complete search history.

(56) References Cited

U.S. PATENT DOCUMENTS

| | | | | | |
|---|---|---|---|---|---|
| 4,749,840 | A | * | 6/1988 | Piwczyk | B23K 26/02 219/121.68 |
| 4,975,571 | A | * | 12/1990 | McMurtry | G01D 5/38 250/231.16 |
| 4,979,826 | A | * | 12/1990 | Ishizuka | G01D 5/38 250/231.16 |
| 5,051,834 | A | * | 9/1991 | Matui | G02B 26/101 348/203 |
| 5,066,130 | A | * | 11/1991 | Tsukiji | G01D 5/38 250/237 G |

(Continued)

FOREIGN PATENT DOCUMENTS

WO 2012160005 A1 11/2012

OTHER PUBLICATIONS

Accuro multi-sensor non-contact measurement platform: measurement instrument for precision measurement, Irmato, The Netherlands, http://www.irmato.com/accuro/, downloaded Nov. 14, 2017.

(Continued)

*Primary Examiner* — Sang H Nguyen
(74) *Attorney, Agent, or Firm* — Thomas B. Ryan, Patent Agent; Jodi A. Reynolds, Esq.; Harter Secrest & Emery LLP

(57) ABSTRACT

An optical measuring system for a measuring machine includes at least two scanning devices for intermittently moving through alternately timed sequences of static measuring positions at which a measuring beam is directed to and from a test object. An optical switch selectively routes the measuring beam through any one of the scanning devices that has settled into one of the static measuring positions.

28 Claims, 4 Drawing Sheets

(56) References Cited

U.S. PATENT DOCUMENTS

| | | | | |
|---|---|---|---|---|
| 5,331,456 | A * | 7/1994 | Horikawa | G02B 21/16 250/372 |
| 5,502,581 | A * | 3/1996 | Sudo | G02B 5/32 359/10 |
| 5,832,107 | A * | 11/1998 | Choate | G01B 11/245 382/154 |
| 5,841,541 | A * | 11/1998 | Dlugos | G01B 11/02 356/634 |
| 6,124,961 | A * | 9/2000 | Tsuda | G03B 37/00 356/510 |
| 6,388,780 | B1 * | 5/2002 | Monaghan | G03H 1/04 219/121.68 |
| 6,396,561 | B1 * | 5/2002 | Vernackt | G03F 7/2032 250/492.2 |
| 6,437,335 | B1 | 8/2002 | Bohn | |
| 6,914,678 | B1 * | 7/2005 | Ulrichsen | B07C 5/342 356/429 |
| 6,954,266 | B2 * | 10/2005 | Tomie | G01N 21/95623 250/492.2 |
| 7,499,584 | B2 | 3/2009 | Delaney | |
| 7,567,596 | B2 * | 7/2009 | Dantus | G01J 11/00 372/30 |
| 8,243,285 | B2 * | 8/2012 | Fishbaine | G01N 21/8806 356/603 |
| 8,520,220 | B2 * | 8/2013 | Krakenes | G01B 11/25 356/237.5 |
| 2001/0001580 | A1 * | 5/2001 | Rowe | G02B 26/123 359/204.1 |
| 2002/0067480 | A1 * | 6/2002 | Takahashi | G01N 21/3581 356/317 |
| 2003/0072011 | A1 * | 4/2003 | Shirley | G01B 11/25 356/601 |
| 2004/0246473 | A1 * | 12/2004 | Hermary | G01B 11/245 356/237.1 |
| 2007/0165208 | A1 * | 7/2007 | Cowburn | G03G 21/046 356/71 |
| 2008/0024794 | A1 * | 1/2008 | Miyazaki | G01N 21/8806 356/612 |
| 2009/0051929 | A1 * | 2/2009 | Koh | G01B 11/25 356/602 |
| 2010/0013934 | A1 | 1/2010 | Saporetti | |
| 2011/0164229 | A1 * | 7/2011 | Staals | G03F 9/7003 355/53 |
| 2012/0069352 | A1 | 3/2012 | Ossig et al. | |
| 2014/0114463 | A1 * | 4/2014 | Shilpiekandula | G05B 19/19 700/173 |
| 2015/0201833 | A1 | 7/2015 | Chong | |
| 2016/0298954 | A1 * | 10/2016 | Chikaoka | G01B 11/002 |
| 2017/0238798 | A1 | 8/2017 | Isogai et al. | |
| 2017/0292829 | A1 | 10/2017 | Seitz et al. | |

OTHER PUBLICATIONS

Faro® Cobalt Array Imager, Faro Technologies, Inc. Lake Mary, Florida, https://www.faro.com/products/factory-metrology/faro-cobalt-array-imager/, downloaded Nov. 14, 2017.

International Search Report and Written Opinion for Patent Application PCT/US2018/057893 dated Jan. 29, 2019.

* cited by examiner

MULTIPLE BEAM SCANNING SYSTEM FOR MEASURING MACHINE

TECHNICAL FIELD

The invention relates to optical measuring systems and particularly to such systems that scan measuring beams over test objects for collecting measurement data.

BACKGROUND OF THE INVENTION

Optical measuring systems that probe test objects with relatively movable measuring beams generally include a beam source, optics for shaping the measuring beam, a scanning device for moving the measuring beam in conjunction with one or more motion stages often under control of a programmed controller for relatively adjusting the position of the measuring beam with respect to a test object, a detector for detecting changes in the measuring beam associated with encounters of the measuring beam with the test object, and a processor programmed for interpreting the detected changes in the measuring beam as measurements of the test object. The measuring beams as optical probes are often arranged to collect data in discrete amounts over limited focus spot sizes on the test object approaching the measurement of individual points on the test object. Such point-by-point measurements are generally recorded within a common coordinate system in which measurements obtained with the measuring beam are combined with measurements also recording the movements of the measuring beam relative to the test object.

Overall, the measuring beams are scanned over predefined areas of the test object. Individual measurements are often collected during momentary lapses in the scanning motion during which relative motion between the measuring beam and the test object is discontinued. Each discrete measurement generally takes place over a finite exposure period during which sufficient quantities of light are collected to support subsequent processing of the collected data. The start-stop stepwise displacement profile of the measuring beam together with the required exposure time for taking measurements while the measuring beam is stopped, significantly extend the time required to take measurements over prescribed areas of test objects.

The stepwise scanning motion of the measuring beam with respect to the test object involves accelerations and decelerations that can momentarily destabilize the relative position of the measuring beam with respect to the test object. To avoid undesirably expanding the confined areas over which the discrete measurements are made, additional time may be needed to allow the relative position of the measuring beam to stabilize at each desired measuring position before measurement data is collected.

SUMMARY OF THE INVENTION

Embodiments disclosed herein split a pathway for separately scanning a measuring beam over areas of the test object. For example, two scanning devices can be used together with an optical switch that directs the measuring beam to one or the other of the scanning devices. While one of the scanning devices is stabilized for collecting measurement data at one position on the test object, the other of the scanning devices can be moved toward a new position on the test object for taking a subsequent measurement. The optical switch directs the measuring beam to the optical scanner that is closest to being stabilized for taking the next measurement.

The two scanning devices can be parts of separate scanning heads for scanning different areas of the test object or the two scanning devices can be incorporated into the same scanning head for separately directing the measuring beam along separate paths. Beam shaping optics, such as for focusing the measuring beam, can be shared where the scanning devices are incorporated into the same scanning head, or the scanning devices can be incorporated into different scanning heads each with a set of beam shaping optics.

In advance of the optical switch, the measuring beams directed through the two scanning devices can be commonly produced and processed. For example, the measuring beams directed to the test object can be produced by the same beam source, and the measuring beams returning from the test object can be monitored by the same detector for detecting changes in the measuring beam associated with encounters of the measuring beam with the test object. A processor programmed for interpreting the detected changes in the measuring beam as measurements of the test object can also be shared. Common motion axes can also be provided for collectively moving the scanning devices relative to the test object.

Measuring systems that rely upon particular optical mechanisms for detecting changes in the test object recorded by the two measuring beams can share other specialized hardware. For example, in measuring systems that rely upon the mechanism of interference, the source beam can be split in advance of the optical switch into a reference beam that propagates along a reference arm to and from a reference reflector and a measuring beam that is directed by the optical switch through one or the other of the scanning devices to support propagations of the measuring beam along separate object arms to and from the test object. Interferometric systems that rely upon different rates of phase change as a function of wavelength for measuring distances can share a wavelength sweeping source together with a detector or a given band width source together with a spectrometer for separating wavelengths over an extended dimension of a detector.

Each of the measurements is collected within a measurement interval while the scanning device and measuring beam that is steered by the scanning device are deemed stationary. Ordinarily, any of the additional time required to move the measuring beam via the scanning device to a new position and to settle the beam together with the scanning device at the new position to an appropriately stationary condition adds time to the measurement cycle in which measurement data about the test object is not being collected. By adding a second scanning device, one of the two scanning devices can be moved and settled during the measurement interval at which the other of the scanning devices is deemed stationary. An optical switch directs the measuring beam to one or the other of the scanning devices that is deemed stationary or is most closely approaching the stationary condition so that measurement data can be collected at the stationary position of one of the scanning devices while the other of the scanning devices is in motion in preparation for taking a subsequent measurement. Where the time required for moving and settling the scanning device to a new position exceeds the measurement interval, a third or more scanning devices can be added as another switching option for directing the measuring beam so that the common detector is collecting a more nearly continuous stream of measurement data from the measuring beam.

One embodiment as an optical measuring system for a measuring machine includes a beam source for producing a measuring beam, at least two scanning devices, and a common detector for detecting changes in the measuring beam returning from a test object through the at least two scanning devices. The at least two scanning devices are arranged for intermittently moving through relatively timed sequences of static measuring positions by which the measuring beam is steered to different positions on the test object en route to the common detector. An optical switch selectively routes the measuring beam through any one of the at least two scanning devices that has settled into one of the static measuring positions.

Preferably, the at least two scanning devices include a first scanning device for intermittently moving through a first of the sequences of static measuring positions at which the measuring beam is directed to and from a first sequence of the different positions on the test object and a second scanning device for intermittently moving through a second of the sequences of static measuring positions at which the measuring beam is directed to and from a second sequence of the different positions on the test object. The optical switch is preferably arranged for (a) directing the measuring beam through the first scanning device to the test object and from the test object through the first scanning device to the common detector while the first scanning device has settled into measuring positions of the first sequence of static measuring positions and (b) directing the measuring beam through the second scanning device to the test object and from the test object through the second scanning device to the detector while the second scanning device has settled into measuring positions of the second sequence of static measuring positions.

In addition, the optical measuring system preferably includes a controller for timing motions of the first and second scanning devices so that (a) the second scanning device is moving while the first scanning device has settled into the measuring positions of the first sequence of static measuring positions and (b) the first scanning device is moving while the second scanning device has settled into the measuring positions of the second sequence of static measuring positions. The controller preferably provides for controlling the optical switch so that the optical switch provides directing the measurement beam through the first and second scanning devices in an alternating fashion.

A first scan head can be associated with the first scanning device and can include optics for shaping the measuring beam that is directed by the first scanning device to the test object. A second scan head can be associated with the second scanning device and can include optics for shaping the measuring beam that is directed by the second scanning device to the test object. In a preferred arrangement, the second scan head is angularly displaced with respect to the first scan head. Alternatively, a scan head can be associated with the first and second scanning devices and can include beam shaping optics for shaping the measuring beam that is directed by the first and second scanning devices to the test object.

The beam source can be arranged to emit a source beam and a beamsplitter can be arranged to divide the source beam into a reference beam that propagates along a reference arm and the measuring beam that is directed by the optical switch through one or the other of the first and second scanning devices as alternative object arms. Preferably, the detector receives portions of both the reference beam that propagates along the reference arm and the measuring beam that propagates along the alternative object arms.

More generally, the detector is preferably arranged for recording measurement data from the measuring beam over respective measurement intervals while the first and second scanning devices have settled into the measuring positions of the first and second sequences of static measuring positions. A processor is preferably arranged for interpreting the measurement data as measurements of the test object.

The first and second scanning devices can be understood to respectively move between the first and second sequences of static measuring positions over respective motion intervals. Preferably, the motion intervals of the first scanning device between the measuring positions of the first sequence of static measuring positions overlap with the measurement intervals of the second scanning device while the second scanning device has settled into the measuring positions of the second sequence of static measuring positions. Similarly, the motion intervals of the second scanning device between the measuring positions of the second sequence of static measuring positions preferably overlap with the measurement intervals of the first scanning device while the first scanning device has settled into the measuring positions of the first sequence of static measuring positions.

Where appropriate, a third scanning device can be provided for intermittently moving through a third sequence of static measuring positions at which the measuring beam is directed to and from a third sequence of positions on the test object. The detector preferably provides for recording measurement data from the measuring beam returning from the test object through the third scanning device, and the controller preferably provides for timing motions of the first, second, and third scanning devices so that (a) the third scanning device is moving while at least one of the first and second scanning devices has settled into the measuring positions of the first or second sequences of static measuring positions and (b) at least one of the first and second scanning devices is moving while the third scanning device has settled into measuring positions of the third sequence of static measuring positions.

In this context, the optical switch preferably provides for directing the measuring beam through the third scanning device to the test object and from the test object through the third scanning device to the detector while the third scanning device has settled into the measuring positions of the third sequence of static measuring positions. The detector is preferably arranged for recording measurement data from the measuring beam within respective measurement intervals while the first, second, and third scanning devices have settled into the measuring positions of the first, second, and third sequences of static measuring positions, and a processor is preferably arranged for interpreting the measurement data as measurements of the test object. The controller preferably provides for timing motions of the first, second, and third scanning devices so that the first and second scanning devices are moving while the third scanning device has settled into the measuring positions of the third sequence of static measuring positions.

Another embodiment as a method of measuring a test object with an optical measuring system includes producing a measuring beam, intermittently moving a first scanning device through a first sequence of static measuring positions at which the measuring beam is directed to and from a first series of positions on a test object, and intermittently moving a second scanning device through a second sequence of static measuring positions at which the measuring beam is directed to and from a second series of positions on the test object. Measurement data is recorded from the measuring beam returning from the test object through the first and second scanning devices to a detector. Motions of the first and second scanning devices are timed so that (a) the second scanning device is moving while the first scanning device has settled into measuring positions of the first sequence of static measuring positions and (b) the first scanning device is moving while the second scanning device has settled into measuring positions of the second sequence of static measuring positions. The measuring beam is directed through the first scanning device to the test object and from the test object through the first scanning device to the detector while the first scanning device has settled into the measuring positions of the first sequence of static measuring positions, and the measuring beam is directed through the second scanning device to the test object and from the test object through the second scanning device to the detector while the second scanning device has settled into the measuring positions of the second sequence of static measuring positions.

Within a first scan head, the measuring beam as shaped by a set of optics is directed by the first scanning device to the test object. Within a second scan head, the measuring beam as shaped by another set of optics is directed by the second scanning device to the test object. The second scan head can be angularly displaced with respect to the first scan head for measuring different areas of the test object. Alternatively, the measuring beam as shaped by the same set of optics can be directed through either of the scanning devices to the test object.

In one arrangement, the measuring beam can be produced by dividing a source beam into a reference beam that propagates along a reference arm and the measuring beam that propagates through one or the other of the first and second scanning devices as alternative object arms.

The step of recording measurement data preferably includes recording measurement data from the measuring beam within respective measurement intervals while the first and second scanning devices have settled into the measuring positions of the first and second sequences of static measuring positions. The step of timing motions preferably includes (a) moving the first and second scanning devices between the respective first and second sequences of static measuring positions over respective motion intervals, (b) overlapping the motion intervals of the first scanning device between the measuring positions of the first sequence of static measuring positions with the measurement intervals of the second scanning device while the second scanning device has settled into the measuring positions of second sequence of static measuring positions, and (c) overlapping the motion intervals of the second scanning device between the measuring positions of the second sequence of static measuring positions with the measurement intervals of the first scanning device while the first scanning device has settled into the measuring positions of first sequence of static measuring positions.

Where appropriate, an additional step can be provided for intermittently moving a third scanning device through a third sequence of static measuring positions at which the measuring beam is directed to and from a third series of positions on the test object. The step of recording measurement data can include recording measurement data from the measuring beam returning from the test object through the third scanning device to the detector, and the step of timing motions can include timing motions of the first, second, and third scanning devices so that (a) the third scanning device is moving while at least one of the first and second scanning devices has settled into the measuring positions of the first or second sequences of static measuring positions and (b) at least one of the first and second scanning devices is moving while the third scanning device has settled into measuring positions of the third sequence of static measuring positions. The measuring beam can be through the third scanning device to the test object and from the test object through the third scanning device to the detector while the third scanning device has settled into the measuring positions of the third sequence of static measuring positions. The step of timing motions can also include timing motions of the first, second, and third scanning devices so that the first and second scanning devices are moving while the third scanning device has settled into the measuring positions of the third sequence of static measuring positions.

BRIEF DESCRIPTION OF THE DRAWING FIGURES

DETAILED DESCRIPTION OF THE INVENTION

Figure 1:
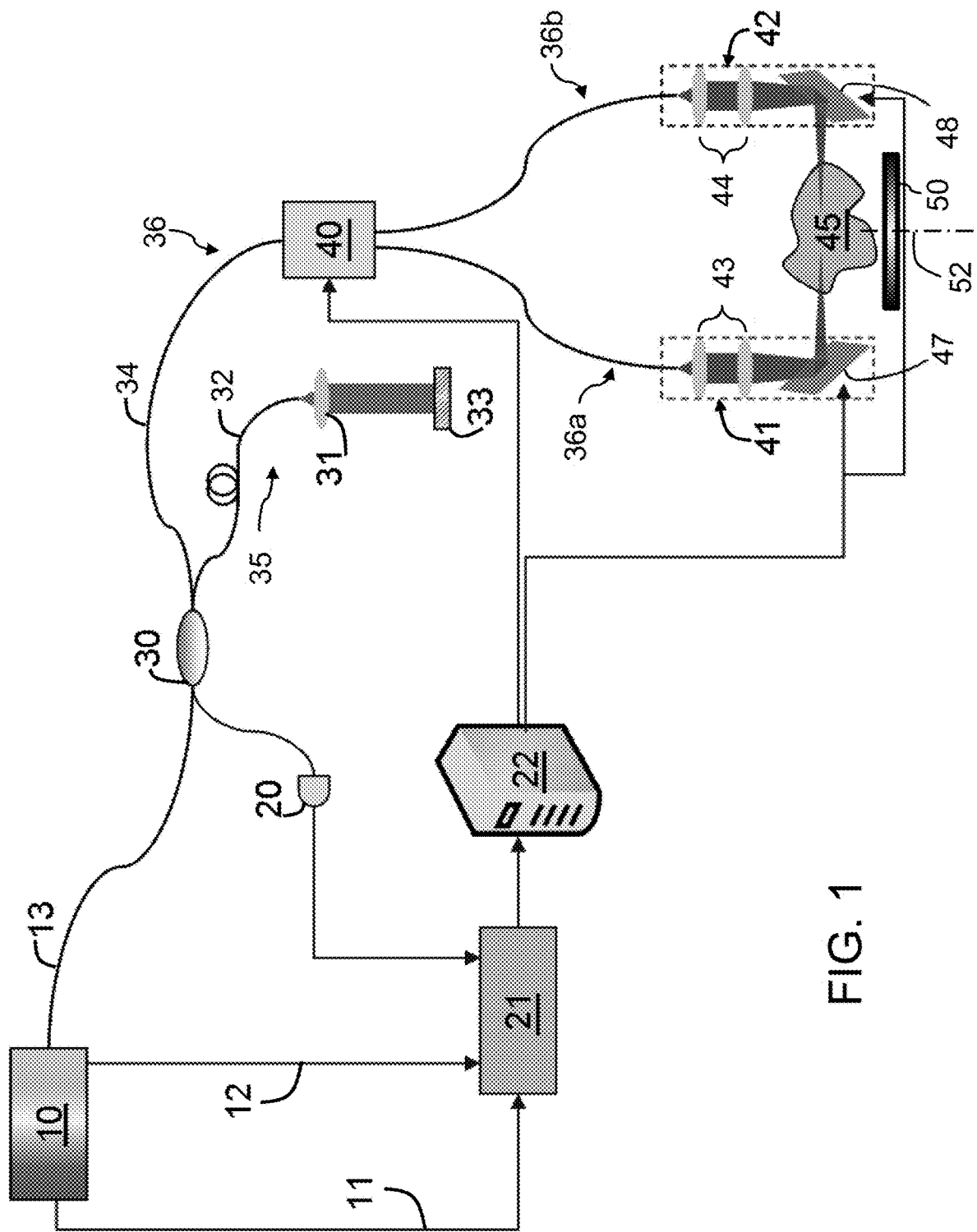
FIG. 1 is a diagram of an optical measuring system for a measuring machine including two relatively controlled scan heads.

An embodiment of an optical measuring system exploiting the mechanism of interference for collecting measurement data about a test object 45 is shown in FIG. 1. The arbitrary shape of the depicted test object 45 is representative of test objects having features in three dimensions requiring measurement. More specifically, a beam source 10 is featured as a swept laser source for an optical coherency tomography system. The beam source 10 outputs a source beam 13 along a fiber optic cable to a fiber optic coupler 30. The source beam 13 periodically sweeps through a predetermined range of wavelengths in accordance with a sweep trigger signal 11 and a sample clock signal 12 that pass through an analog-to-digital converter 21 en route to a workstation computer 22.

The fiber optic coupler 30 functions as a beamsplitter for dividing the source beam between two fiber optic cables into a reference beam 32 that propagates along a reference arm 35 through reference arm optics 31, such as a collimator, to a reference reflector 33 and a measuring beam 34 that propagates along an object arm 36 that is split by an optical switch 40 into alternate object arms 36a and 36b. The optical switch 40 is preferably a fast optical switch with low crosstalk such as a solid state optical switch from Boston Applied Technologies, Inc. of Woburn, Mass. sold as a Nanona™ High Speed & Low Loss Optical Switch for directing the measuring beam along one or the other of the alternate object arms 36a or 36b.

A first scan head 41 is located along the alternate object arm 36a and a second scan head 42 is located along the other alternate object arm 36b. Both the first and second scan heads 41 and 42 include respective sets of beam shaping optics 43 and 44, such as a combination of collimating and focusing optics, for converting the measuring beam 34 in an expanded form into a converging beam that is intended to be focused on the test object 45. However, the converging measuring beam 34 is interrupted within both the first and second scan heads 41 and 42 by respective scanning devices 47 and 48, such as beam steering mirrors, for directing the focused measuring beam 34 over respective areas of the test object 45. The scanning devices 47 and 48 can be fast beam scanning hardware such as two-axis MEMS-based mirrors from Mirrorcle Technologies, Inc. of Richmond, Calif. As shown, the two scan heads 41 and 42 have a nearly 180 degree azimuthal separation but any desired angular separation can be chosen. The measuring beam 34 as steered by the scanning devices 47 and 48 preferably sweeps a two-dimensional range of angles covering the areas of the test object 45 intended for measurement. Although shown as beam-steering mirrors, the scanning devices 47 and 48 can include other movable elements such as prisms, lenses, or diffraction gratings. However, reducing the mass of any movable components can reduce the amount of time required to move and settle the components. Any measuring system relying on scanning device that requires more than inconsequential time to move a measuring beam can benefit from the proposed arrangements.

As shown, the test object 45 is represented as being mounted on a rotating stage 50 of the measuring machine for rotating the test object 45 about a vertical axis 52 and thereby presenting different portions of the test object 45 within the range of the scan heads 41 and 42. While the scan heads 41 and 42 are preferably fixed relative to one another to preserve registrations between the data sets from the two scan heads 41 and 42, other machine axes could also be used for rotating or translating the test object 45 and the two scan heads 41 and 42 relative to each other. While the test object 45 is depicted as one contiguous body, the test object 45 is also intended to be representative of multiple bodies presented for measurement, and the two scan heads 41 and 42, for example, can be arranged for scanning different bodies, such as multiples of the same part.

Reflections from the test object 45 return the measuring beam 34 through one or the other of the scanning devices 47 or 48 through the optical switch 40 to the fiber optic coupler 30. Similarly, reflections from the reference reflector 33 return the reference beam 32 to the fiber optic coupler 30 where the combined reference and measuring beams 32 and 34 are directed to a detector 20 that converts the captured optical signal into an electrical signal that passes through the analog-to-digital converter 21 to the workstation computer 22 for processing as measurement data of the test object 45.

While the overall optical layout is shown in the form of a Michelson interferometer, other interferometer layouts including that of a Fizeau interferometer could also be used for purposes of Optical Coherence Tomography. Instead of sweeping the source beam through a band of wavelengths, the source beam could be composed of a similar band of wavelengths and an arrayed detector can be combined with a spectrometer to separate the interference phases of the different wavelengths over an enlarged dimension of the detector. Other optical mechanisms with scanned measurement beams could also be used for collecting measurement data from test objects including coherence scanning interferometry based on a white light scanner. Although shown with various fiber optic components, the measuring system can be arranged with other types of components including directing the various beams through free space between the components. While the two scan heads 41 and 42 are depicted as sharing the same reference arm, the optical switch 40 could be positioned before the point of interferometric division, in which case each scan head 41 and 42 would include its own coupler/beamsplitter and reference arm optics.

The workstation computer 22, which can be arranged as a programmable controller times operations of the optical switch 40 and the two scanning devices 47 and 48 with the swept beam source 10 and the detector 20. For example, each of the two scanning devices 47 and 48 is intermittently moved through a sequence of static measuring positions at which the measuring beam is directed to and from a first series of positions on a test object 45. The controller times the motions of the first and second scanning devices so that (a) the scanning device 48 is moving while the scanning device 47 has settled into measuring positions of the first sequence of static measuring positions and (b) the scanning device 47 is moving while the scanning device 48 has settled into measuring positions of the second sequence of static measuring positions. Thus, one of the scanning devices is moved for at least part of the time that the other of the scanning devices is stationary. The optical switch 40 is controlled by the controller for (a) directing the measuring beam 34 through the scanning device 47 to the test object 45 and from the test object 45 through the scanning device 47 to the detector 20 while the scanning device 47 has settled into the measuring positions of the first sequence of static measuring positions and (b) directing the measuring beam 34 through the scanning device 48 to the test object 45 and from the test object 45 through the scanning device 48 to the detector 20 while the scanning device 48 has settled into the measuring positions of the second sequence of static measuring positions. The swept output of the beam source is timed within the controller to correspond with the settling of either of the scanning devices 47 or 48 into the measuring positions of the first or second sequences of static measuring positions. Similarly, the measuring data output from the detector 20 is processed in increments corresponding to the measuring positions of the first or second sequences of static measuring positions. Within the workstation computer 22 a programmable processor is arranged for interpreting the measurement data as measurements of the test object 45. The processing of the measurement data from the detector 20 can take place simultaneously with the data acquisition or subsequently during a gap in data acquisition.

The detector 20 is arranged for recording measurement data from the measuring beam 34 within respective measurement intervals while the first and second scanning devices 47 and 48 have settled into the measuring positions of the first and second sequences of static measuring positions and the processor, either contemporaneously or subsequently, interprets the measurement data as measurements of the test object 45. The first and second scanning devices 47 and 48 respectively move between the first and second sequences of static measuring positions over respective motion intervals.

Figure 2:
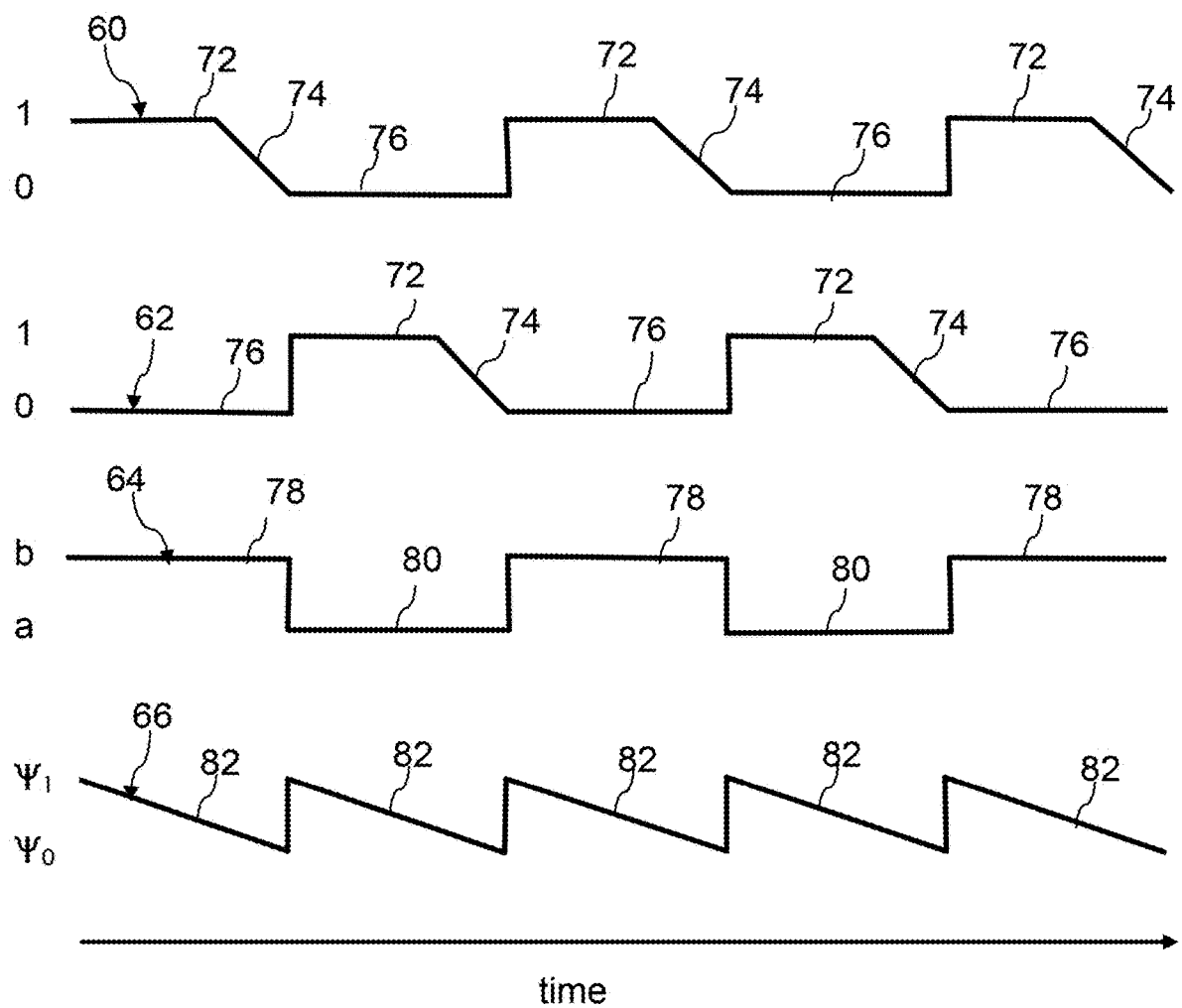
FIG. 2 is a graph including timelines relating the operations of two scanning devices, an optical switch, and a beam source.

In the timing graph of FIG. 2, the two upper lines 60 and 62 plot the motion behavior of the respective scanning devices 47 and 48 between a moving state designated at level "1" and a stationary state at level "0." The plateaued peaks 72 at level "1" represent the time during which the scanning devices 47 and 48 are in motion for moving the beam-steering mirrors to a new measuring position. The inclines 74 between levels "1" and "0" represent the time during which the beam-steering mirrors progressively settle into a static condition. Together, the respective plateaued peaks 72 and their adjoining inclines 74 correspond to the motion intervals. The flat troughs 76 at level "0" represent the time periods during which the scanning devices 47 and 48 are maintained in the static condition at which measurement data is acquired. The flat troughs 76 of the plots 60 and 62 define respective first and second sequences of static measuring positions at which the measuring beam 34 can be directed through the scanning devices 47 and 48 to and from the test object 45 during a succession of measurement intervals. The line 64 represents the operation of the optical switch 40 in which level "a" represents the switch position in which the measuring beam 34 is directed along the alternate object arm 36a through the scanning device 47 to the test object 45 and level "b" represents the switch position in which the measuring beam 34 is directed along the alternate object arm 36b through the scanning device 48 to the test object 45. The plateaued peaks 78 represent the time during which the switch operates at level "b" for directing light to the alternate object arm "b" and corresponds to the time periods during which the scanning device 48 is maintained in a static condition. The flat troughs 80 represent the time during which the switch operates at level "a" for directing light to the alternate object arm "a" and corresponds to the time periods during which the scanning device 47 is maintained in a static condition. The line 66 represents the output of the swept beam source 10 in which the output varies in wavelength over each of the succession of sweep intervals 82 from $\psi_1$ to $\psi_2$. Each sweep interval 82 signifies the time taken to acquire data for a single measurement of the test object 45.

The graph of FIG. 2 represents an idealized condition in which the measurement intervals correspond to the motion intervals so that with just two scanning devices 47 and 48, near continuous data acquisition is possible, interrupted only by the efficiencies of the various devices including the optical switch 40, the swept beam source 10, and the detector 20 for changing operating states. The measurement intervals while the respective scanning devices 47 and 48 have settled into a static condition are preferably adjusted to match the time required to accumulate the desired measurement data, such as the time between successive wavelength sweeps of the source 10. However, the motion intervals can vary depending upon the amount of time required to move and settle the scanning devices 47 and 48, which can depend upon the instant travel requirements of each move. Although minimized or at least significantly reduced, temporal gaps beyond switching speeds or laser resets can arise between subsequent measurements at which measurement data is acquired due to such variations.

In some arrangements, the motion intervals may be much longer than the measurement intervals so that data acquisition with just two scanning devices 47 and 48 becomes more intermittent and a less efficient use of time. By connecting another (third) scan head to the optical switch 40 as an option for delivering the measuring beam 34 through another (third) scanning device to the test object 45, partially overlapping motion intervals can be used to support more continuous acquisitions of data in which the measurement intervals are more nearly continuous. Switching among more than two channels generally requires either a fast switch with more than two output ports or a series of 1×2 port switches. While the three scan heads can be relatively oriented as desired, in one envisioned arrangement, the three scan heads can be separated by equal angular increments of 120 degrees about the vertical axis 52.

Figure 3:
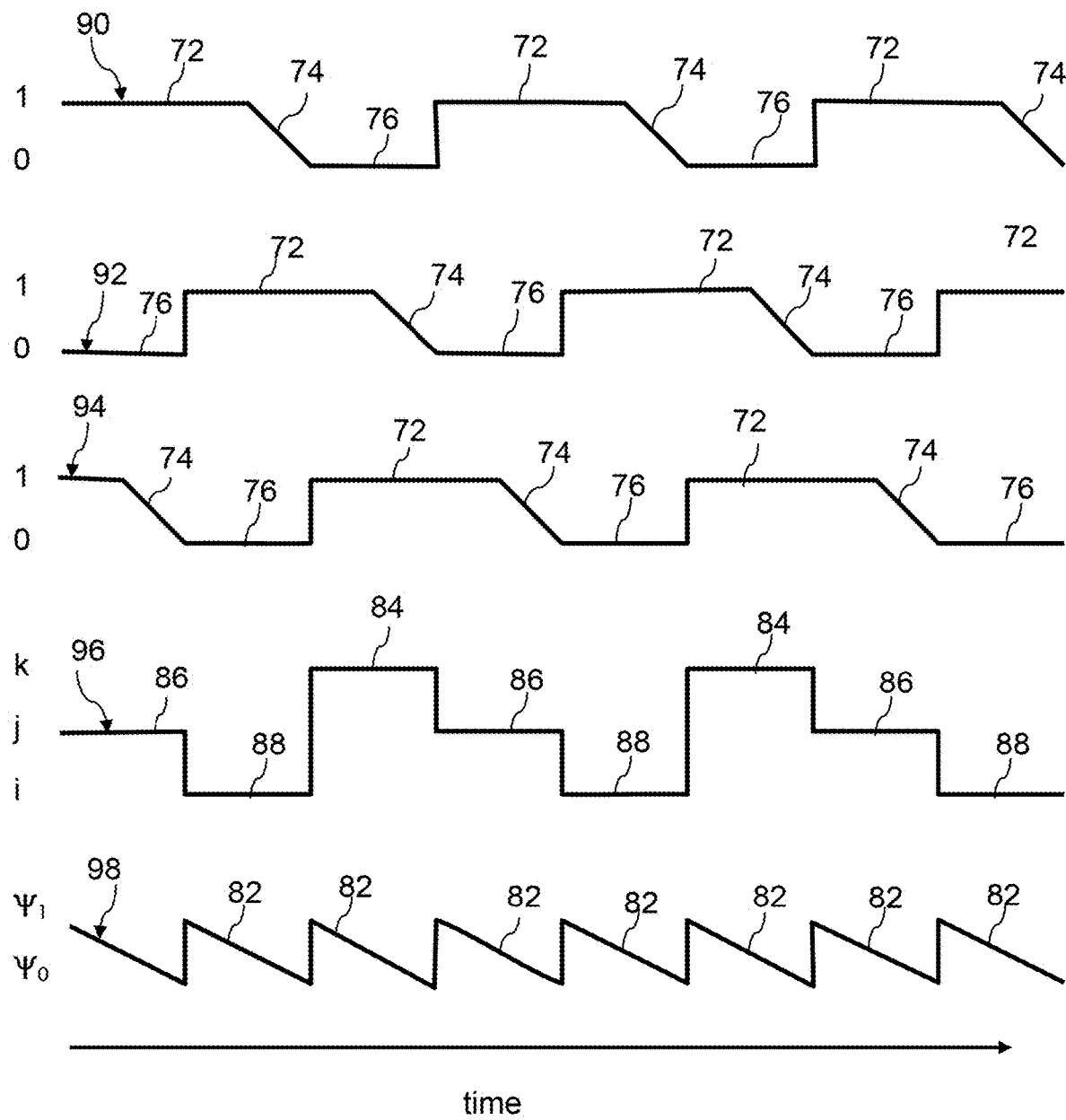
FIG. 3 is a graph including timelines relating the operations of three scanning devices, an optical switch, and a beam source.

The timing graph of FIG. 3, presents three upper lines 90, 92, and 94 that plot the motion behavior of the three scanning devices operating between a moving state designated at level "1" and a stationary state at level "0." Similar to the preceding graph, the plateaued peaks 72 at level "1" represent the time during which the scanning devices are in motion for moving the beam-steering mirrors to a new measuring position. The inclines 74 between levels "1" and "0" represent the time during which the beam-steering mirrors progressively settle into a static condition. Together, the respective plateaued peaks 72 and their adjoining inclines 74 correspond to the motion intervals. The flat troughs 76 at level "0" represent the time periods during which the scanning devices are maintained in the static condition during which measurement data is acquired. The flat troughs 76 of the plots 90, 92, and 94 define respective first, second, and third sequences of static measuring positions at which the measuring beam 34 can be directed to and from the test object 45 during a succession of measurement intervals. The line 96 represents the operation of the optical switch 40 in which level "k" represents the switch position in which the measuring beam 34 is directed through the scanning device represented by the plot of line 90, level "j" represents the switch position in which the measuring beam 34 is directed through the scanning device represented by the plot of line 92, and level "i" represents the switch position in which the measuring beam 34 is directed through the scanning device represented by the plot of line 94. The plateaued peaks 84 at level "k" are temporally aligned with the measurement intervals defined by the scanning device of line 90. The intermediate flats 86 at level "j" are temporally aligned with the measurement intervals defined by the scanning device of line 92. The flat troughs 88 at level "i" are temporally aligned with the measurement intervals defined by the scanning device of line 94. The line 98, representing the output of the swept beam source 10, shows the variation in wavelength from $\psi 1$ to $\psi 2$ over scan intervals 82 having a periodicity matching both the operation of the optical switch 40 and the successive measurement intervals provided by the coordinated operations of the three scanning devices. Thus, even though the measurement intervals are only one-half of the length of the motion intervals, with just three coordinated scanning devices, near continuous data acquisition is possible. Additional scanning devices can be added in a similar coordinated fashion to accommodate other ratios of the measurement intervals to the motion intervals including measurement or motion intervals that might vary between the scanning devices. The scan heads themselves can differ from one another for such purposes as adapting to the measurement of different test object features.

Figure 4:
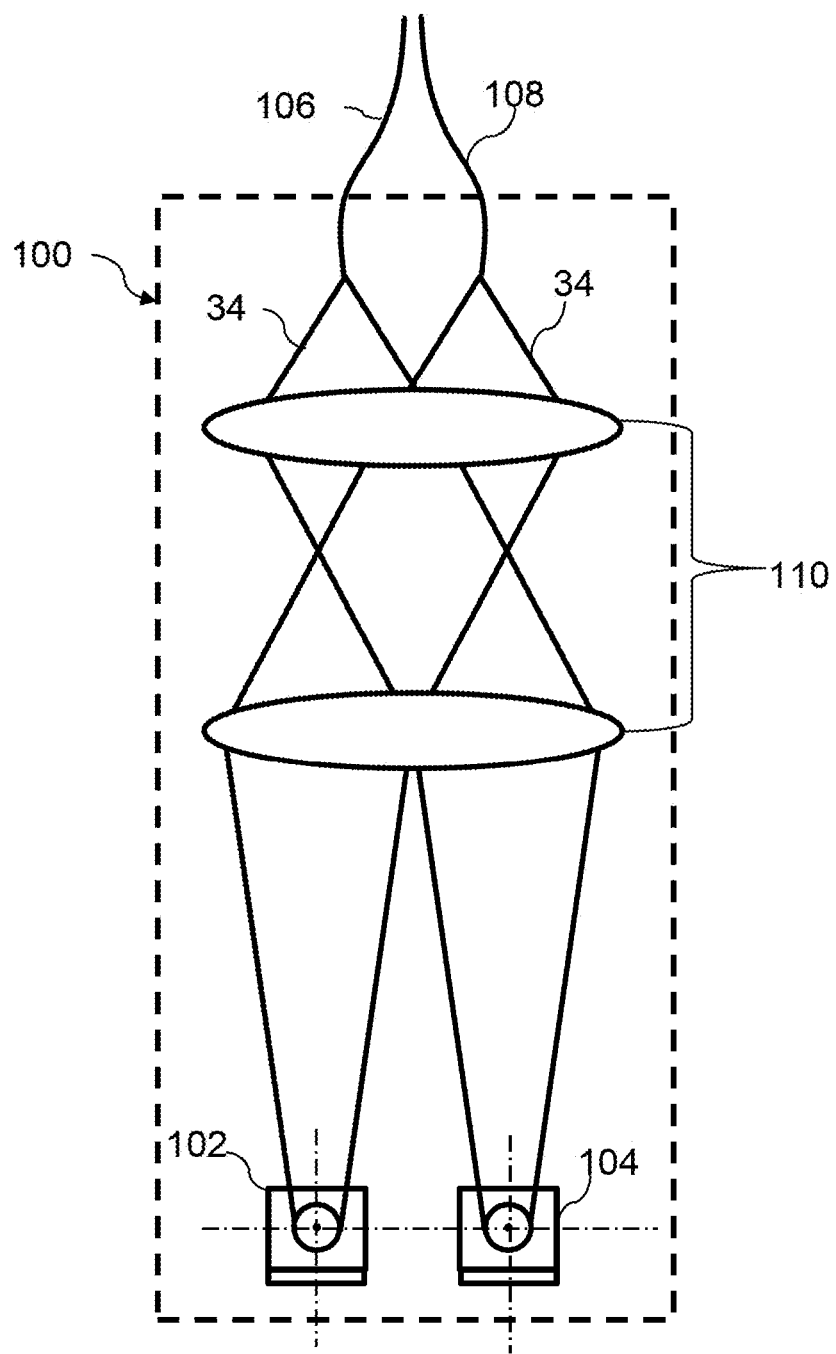
FIG. 4 is a schematic layout of an alternative scan head incorporating two scanning devices.

An alternative scan head 100 is depicted in FIG. 4. Instead of dividing scanning devices between scan heads, the scan head 100 incorporates two scanning devices 102 and 104. Fiber optic cables 106 and 108 alternately convey the measuring beam 34 from an optical switch similar to the optical switch 40 of the preceding embodiment. Beam shaping optics 110 collimates the expanding light emitted from the fiber optic cables 106 and 108 from off-axis positions and focuses the alternately converging measuring beams 34 through the respective scanning devices 102 and 104 for separately steering the alternately converging measuring beams.

In the view shown, the scanning devices 102 and 104 are steering mirrors that independently reflect the focused beams out of the plane of view. However, both steering mirrors are capable of pivoting about two axes for alternately scanning the measuring beam 34 across areas of the test object.

Although the scanning devices are shown in a common nominal orientation, the scanning devices 102 and 104 can be differently positioned or oriented. Fold mirrors or other intervening optics can be used for further separating or relatively positioning the scanning devices within the scan head 100. In addition, more than two scanning devices can be incorporated into the same scan head 100, particularly by adding other fiber optic cables at different offset positions connected to the optical switch.

In keeping with the overall teaching of this invention, variants of the various features and components can be used and combined in different arrangements for various optical measuring purposes, including currently unanticipated options and improvements, within the scope of the following claims.

The invention claimed is:

1. An optical measuring system for measuring machines comprising:
   a beam source for producing a measuring beam;
   at least two scanning devices separately movable through differently timed sequences of static measuring positions by which the measuring beam is steered to different positions on a test object;
   a common detector for detecting changes in the measuring beam returning from the test object through the at least two scanning devices;
   a computer coupled to the at least two scanning devices the computer being arranged for controlling the movement of the at least two scanning devices through the differently timed sequences of static measuring positions; and
   an optical switch for selectively routing the measuring beam through any one of the at least two scanning devices that has settled into one of the static measuring positions.

2. The optical measuring system of claim 1 in which the at least two scanning devices include a first scanning device for intermittently moving through a first of the sequences of static measuring positions at which the measuring beam is directed to and from a first sequence of the different positions on the test object and a second scanning device for intermittently moving through a second of the sequences of static measuring positions at which the measuring beam is directed to and from a second sequence of the different positions on the test object.

3. The optical measuring system of claim 2 in which the optical switch is arranged for (a) directing the measuring beam through the first scanning device to the test object and from the test object through the first scanning device to the common detector while the first scanning device has settled into measuring positions of the first sequence of static measuring positions and (b) directing the measuring beam through the second scanning device to the test object and from the test object through the second scanning device to the detector while the second scanning device has settled into measuring positions of the second sequence of static measuring positions.

4. The optical measuring system of claim 3 wherein the computer is a controller for timing motions of the first and second scanning devices so that (a) the second scanning device is moving while the first scanning device has settled into the measuring positions of the first sequence of static measuring positions and (b) the first scanning device is moving while the second scanning device has settled into the measuring positions of the second sequence of static measuring positions.

5. The optical measuring system of claim 4 in which the controller provides for controlling the optical switch so that the optical switch provides directing the measurement beam through the first and second scanning devices in an alternating fashion.

6. The optical measuring system of claim 3 further comprising:
   a first scan head associated with the first scanning device and including optics for shaping the measuring beam that is directed by the first scanning device to the test object; and
   a second scan head associated with the second scanning device and including optics for shaping the measuring beam that is directed by the second scanning device to the test object.

7. The optical measuring system of claim 6 in which the second scan head is angularly displaced with respect to the first scan head.

8. The optical measuring system of claim 3 further comprising a scan head associated with the first and second scanning devices and including beam shaping optics for shaping the measuring beam that is directed by the first and second scanning devices to the test object.

9. The optical measuring system of claim 3 in which the beam source emits a source beam and further comprising a beamsplitter that divides the source beam into a reference beam that propagates along a reference arm and the measuring beam that is directed by the optical switch through one or the other of the first and second scanning devices as alternative object arms.

10. The optical measuring system of claim 9 in which the detector receives portions of both the reference beam that propagates along the reference arm and the measuring beam that propagates along the alternative object arms.

11. The optical measuring system of claim 3 in which the detector is arranged for recording measurement data from the measuring beam over respective measurement intervals while the first and second scanning devices have settled into the measuring positions of the first and second sequences of static measuring positions and a processor is arranged for interpreting the measurement data as measurements of the test object.

12. The optical measuring system of claim 11 in which (a) the first and second scanning devices respectively move between the first and second sequences of static measuring positions over respective motion intervals, (b) the motion intervals of the first scanning device between the measuring positions of the first sequence of static measuring positions overlap with the measurement intervals of the second scanning device while the second scanning device has settled into the measuring positions of the second sequence of static measuring positions, and (c) the motion intervals of the second scanning device between the measuring positions of the second sequence of static measuring positions overlap with the measurement intervals of the first scanning device while the first scanning device has settled into the measuring positions of the first sequence of static measuring positions.

13. The optical measuring system of claim 2 further comprising a third scanning device for intermittently moving through a third sequence of static measuring positions at which the measuring beam is directed to and from a third sequence of positions on the test object.

14. The optical measuring system of claim 13 in which the detector provides for recording measurement data from the measuring beam returning from the test object through the third scanning device, and the computer provides for timing motions of the first, second, and third scanning devices so that (a) the third scanning device is moving while at least one of the first and second scanning devices has settled into the measuring positions of the first or second sequences of static measuring positions and (b) at least one of the first and second scanning devices is moving while the third scanning device has settled into measuring positions of the third sequence of static measuring positions.

15. The optical measuring system of claim 14 in which the optical switch provides for directing the measuring beam through the third scanning device to the test object and from the test object through the third scanning device to the detector while the third scanning device has settled into the measuring positions of the third sequence of static measuring positions.

16. The optical measuring system of claim 13 in which the detector is arranged for recording measurement data from the measuring beam over respective measurement intervals while the first, second, and third scanning devices have settled into the measuring positions of the first, second, and third sequences of static measuring positions and a processor is arranged for interpreting the measurement data as measurements of the test object.

17. The optical measuring system of claim 16 in which the computer provides for timing motions of the first, second, and third scanning devices so that the first and second scanning devices are moving while the third scanning device has settled into the measuring positions of the third sequence of static measuring positions.

18. A method of measuring a test object with an optical measuring system comprising the steps of:
    producing a measuring beam;
    intermittently moving a first scanning device through a first sequence of static measuring positions at which the measuring beam is directed to and from a first series of positions on a test object;
    intermittently moving a second scanning device through a second sequence of static measuring positions at which the measuring beam is directed to and from a second series of positions on the test object;
    recording measurement data from the measuring beam returning from the test object through the first and second scanning devices to a detector;
    timing motions of the first and second scanning devices so that (a) the second scanning device is moving while the first scanning device has settled into measuring positions of the first sequence of static measuring positions and (b) the first scanning device is moving while the second scanning device has settled into measuring positions of the second sequence of static measuring positions;
    directing the measuring beam through the first scanning device to the test object and from the test object through the first scanning device to the detector while the first scanning device has settled into the measuring positions of the first sequence of static measuring positions; and
    directing the measuring beam through the second scanning device to the test object and from the test object through the second scanning device to the detector while the second scanning device has settled into the measuring positions of the second sequence of static measuring positions.

19. The method of claim 18 in which a first scan head is associated with the first scanning device and includes optics for shaping the measuring beam that is directed by the first scanning device to the test object, a second scan head is associated with the second scanning device and includes optics for shaping the measuring beam that is directed by the second scanning device to the test object, and further comprising a step of angularly displacing the second scan head with respect to the first scan head for measuring different areas of the test object.

20. The method of claim 18 in which a scan head is associated with the first and second scanning devices and includes beam shaping optics for shaping the measuring beam, the step of directing the measuring beam through the first scanning device includes directing the measuring beam that is shaped by the beam shaping optics through the first scanning device to the test object while the first scanning device has settled into the measuring positions of the first sequence of static measuring positions, and the step of directing the measuring beam through the second scanning device includes directing the measuring beam that is shaped by the beam shaping optics through the second scanning device to the test object while the second scanning device has settled into the measuring positions of the second sequence of static measuring positions.

21. The method of claim 18 in which the step of producing a measuring beam includes dividing a source beam into a reference beam that propagates along a reference arm and the measuring beam that propagates through one or the other of the first and second scanning devices as alternative object arms.

22. The method of claim 18 in which the step of recording measurement data includes recording measurement data from the measuring beam over respective measurement intervals while the first and second scanning devices have settled into the measuring positions of the first and second sequences of static measuring positions.

23. The method of claim 22 in which the step of timing motions includes:
    moving the first and second scanning devices between the respective first and second sequences of static measuring positions over respective motion intervals;
    overlapping the motion intervals of the first scanning device between the measuring positions of the first sequence of static measuring positions with the measurement intervals of the second scanning device while the second scanning device has settled into the measuring positions of the second sequence of static measuring positions; and
    overlapping the motion intervals of the second scanning device between the measuring positions of the second sequence of static measuring positions with the measurement intervals of the first scanning device while the first scanning device has settled into the measuring positions of the first sequence of static measuring positions.

24. The method of claim 18 comprising an additional step of intermittently moving a third scanning device through a third sequence of static measuring positions at which the measuring beam is directed to and from a third series of positions on the test object.

25. The method of claim 24 in which the step of recording measurement data includes recording measurement data from the measuring beam returning from the test object through the third scanning device to the detector, and the step of timing motions includes timing motions of the first, second, and third scanning devices so that (a) the third scanning device is moving while at least one of the first and second scanning devices has settled into the measuring positions of the first or second sequences of static measuring positions and (b) at least one of the first and second scanning devices is moving while the third scanning device has settled into measuring positions of the third sequence of static measuring positions.

26. The method of claim 25 comprising an additional step of directing the measuring beam through the third scanning device to the test object and from the test object through the third scanning device to the detector while the third scanning device has settled into the measuring positions of the third sequence of static measuring positions.

27. The method of claim 24 in which the step of recording measurement data includes recording measurement data from the measuring beam over respective measurement intervals while the first, second, and third scanning devices have settled into the measuring positions of the first, second, and third sequences of static measuring positions.

28. The method of claim 27 in which the step of timing motions includes timing motions of the first, second, and third scanning devices so that at least one of the first and second scanning devices is moving while the third scanning device has settled into the measuring positions of the third sequence of static measuring positions.

* * * * *